(12) United States Patent
Chen et al.

(10) Patent No.: US 10,606,722 B2
(45) Date of Patent: Mar. 31, 2020

(54) METHOD AND SYSTEM FOR DIAGNOSING REMAINING LIFETIME OF STORAGES IN DATA CENTER

(71) Applicant: ProphetStor Data Services, Inc., Taichung (TW)

(72) Inventors: Wen Shyen Chen, Taichung (TW); Wen-Chieh Hsieh, New Taipei (TW); Chong Xuan Hong, Taichung (TW)

(73) Assignee: PROPHETSTOR DATA SERVICES, INC., Taichung (TW)

( * ) Notice: Subject to any disclaimer, the term of this patent is extended or adjusted under 35 U.S.C. 154(b) by 145 days.

(21) Appl. No.: 15/817,639

(22) Filed: Nov. 20, 2017

(65) Prior Publication Data

US 2019/0138415 A1 May 9, 2019

(30) Foreign Application Priority Data

Nov. 7, 2017 (TW) .............. 106138414 A

(51) Int. Cl.
| | |
|---|---|
| *G06F 11/30* | (2006.01) |
| *G06F 11/22* | (2006.01) |
| *G06F 3/06* | (2006.01) |
| *G06N 20/00* | (2019.01) |

(Continued)

(52) U.S. Cl.
CPC .......... *G06F 11/2257* (2013.01); *G06F 3/067* (2013.01); *G06F 3/0616* (2013.01);
(Continued)

(58) Field of Classification Search
CPC ............... G06F 11/0754; G06F 11/079; G06F 11/0796; G06F 11/30; G06F 11/3003;
(Continued)

(56) References Cited

U.S. PATENT DOCUMENTS

| | | | |
|---|---|---|---|
| 9,449,283 B1 | 9/2016 | Purpura et al. | |
| 9,535,808 B2 * | 1/2017 | Bates ................. | G06F 11/0709 |

(Continued)

FOREIGN PATENT DOCUMENTS

| | | |
|---|---|---|
| CN | 105068901 | 11/2015 |
| CN | 106598805 | 4/2017 |
| TW | 201629766 | 8/2016 |

OTHER PUBLICATIONS

Joseph F. Murray et al.; "Machine Learning Methods for Predicting Failures in Hard Drives: A Multiple-Instance Application" Journal of Medicine Learning Research 6 (2005) 783-816.
Extended European Search Report for Application No. 17201964.8.
Taiwan Search Report for Application No. 10720580450.

*Primary Examiner* — Joseph O Schell
(74) *Attorney, Agent, or Firm* — Jackson IPG PLLC; Demian K. Jackson

(57) ABSTRACT

A method and a system for diagnosing remaining lifetime of storages in a data center are disclosed. The method includes the steps of: a) sequentially and periodically collecting operating attributes of failed storages along with time-to-fail records of the failed storages in a data center; b) grouping the operating attributes collected at the same time or fallen in a continuous period of time so that each group has the same number of operating attributes; c) sequentially marking a time tag for the groups of operating attributes; d) generating a trend model of remaining lifetime of the storages from the operating attributes and time-to-fail records by ML and/or DL algorithm(s) with the groups of operating attributes and time-to-fail records fed according to the order of the time tags; and e) inputting a set of operating attributes of a currently operating storage into the trend model to calculate a remaining lifetime therefor.

19 Claims, 10 Drawing Sheets

(51) Int. Cl.
 *G06F 11/34* (2006.01)
 *G06N 3/08* (2006.01)
(52) U.S. Cl.
 CPC ........ *G06F 3/0653* (2013.01); *G06F 11/3034* (2013.01); *G06F 11/3447* (2013.01); *G06N 20/00* (2019.01); *G06F 11/3003* (2013.01); *G06F 11/3055* (2013.01); *G06F 11/3058* (2013.01); *G06N 3/084* (2013.01)
(58) Field of Classification Search
 CPC ............. G06F 11/3034; G06F 11/3055; G06F 11/3058; G06F 11/3447; G06F 11/3452; G06F 11/22; G06F 11/2257; G06F 3/0616
 See application file for complete search history.

(56) References Cited

U.S. PATENT DOCUMENTS

| | | | |
|---|---|---|---|
| 9,542,296 B1* | 1/2017 | Engers | G06F 11/3452 |
| 9,645,751 B2* | 5/2017 | Ryan | G11C 16/349 |
| 2004/0066699 A1* | 4/2004 | Nabekura | G06F 3/0607 |
| | | | 365/232 |
| 2009/0271445 A1* | 10/2009 | Emaru | G06F 11/2069 |
| 2014/0146648 A1* | 5/2014 | Alber | G11B 27/002 |
| | | | 369/53.1 |
| 2016/0232450 A1* | 8/2016 | Chen | G06F 11/00 |
| 2016/0364279 A1* | 12/2016 | Brew | G06F 11/079 |
| 2017/0115899 A1* | 4/2017 | Franke | G06F 3/0616 |
| 2017/0193460 A1* | 7/2017 | Subramaniyan | G06Q 10/20 |
| 2017/0359242 A1* | 12/2017 | Zavesky | H04L 41/142 |
| 2018/0159735 A1* | 6/2018 | Beyh | H04L 41/0823 |

* cited by examiner

| Time of Collection | | 08/26 12:00 | 08/27 12:00 | 08/28 12:00 | 08/29 12:00 | 08/30 12:00 | 08/31 12:00 | 09/01 12:00 | 09/01 13:00 |
|---|---|---|---|---|---|---|---|---|---|
| S.M.A.R.T. Attributes | 00x1 | data.. | data.. | data.. | data.. | data.. | data.. | data.. | NA |
| | 00x3 | data.. | data.. | data.. | data.. | data.. | data.. | data.. | NA |
| | 00x4 | data.. | data.. | data.. | data.. | data.. | data.. | data.. | NA |
| | 00x5 | data.. | data.. | data.. | data.. | data.. | data.. | data.. | NA |
| | 00x7 | data.. | data.. | data.. | data.. | data.. | data.. | data.. | NA |
| | 00x9 | data.. | data.. | data.. | data.. | data.. | data.. | data.. | NA |
| | 00xA | data.. | data.. | data.. | data.. | data.. | data.. | data.. | NA |
| | 00xC | data.. | data.. | data.. | data.. | data.. | data.. | data.. | NA |
| | 0xB8 | data.. | data.. | data.. | data.. | data.. | data.. | data.. | NA |
| | 0xBB | data.. | data.. | data.. | data.. | data.. | data.. | data.. | NA |
| | 0xBC | data.. | data.. | data.. | data.. | data.. | data.. | data.. | NA |
| | 0xBD | data.. | data.. | data.. | data.. | data.. | data.. | data.. | NA |
| Time-to-fail Record of remaining time (Day) | | 7 | 6 | 5 | 4 | 3 | 2 | 1 | 0 |

| M | D | S1 | S2 | TR | S3 | S4 | S5 | S6 | S7 | TR | S8 |
|---|---|----|----|----|----|----|----|----|----|----|----|
| 1 | 25 | O | - | - | O | O | O | O | - | - | O |
| 1 | 24 | O | - | - | O | O | O | O | X | 01 | O |
| 1 | 23 | O | - | - | O | O | O | O | O | 02 | O |
| 1 | 22 | O | - | - | O | O | O | O | O | 03 | O |
| 1 | 21 | O | - | - | O | O | O | O | O | 04 | O |
| 1 | 20 | O | - | - | O | O | O | O | O | 05 | O |
| 1 | 19 | O | - | - | O | O | O | O | O | 06 | O |
| 1 | 18 | O | - | - | O | O | O | O | O | 07 | O |
| 1 | 17 | O | - | - | O | O | O | O | O | 08 | O |
| 1 | 16 | O | - | - | O | O | O | O | O | 09 | O |
| 1 | 15 | O | - | - | O | O | O | O | O | 10 | O |
| 1 | 14 | O | - | - | O | O | O | O | O | 11 | O |
| 1 | 13 | O | - | - | O | O | O | O | O | 12 | O |
| 1 | 12 | O | X | 01 | O | O | O | O | O | 13 | O |
| 1 | 11 | O | O | 02 | O | O | O | O | O | 14 | O |
| 1 | 10 | O | O | 03 | O | O | O | O | O | 15 | O |
| 1 | 9 | O | O | 04 | O | O | O | O | O | 16 | O |
| 1 | 8 | O | O | 05 | O | O | O | O | O | 17 | O |
| 1 | 7 | O | O | 06 | O | O | O | O | O | 18 | O |
| 1 | 6 | O | O | 07 | O | O | O | O | O | 19 | O |
| 1 | 5 | O | O | 08 | O | O | O | O | O | 20 | O |
| 1 | 4 | O | O | 09 | O | O | O | O | O | 21 | O |
| 1 | 3 | O | O | 10 | O | O | O | O | O | 22 | O |
| 1 | 2 | O | O | 11 | O | O | O | O | O | 23 | O |
| 1 | 1 | O | O | 12 | O | O | O | O | O | 24 | O |

| Time-to-fail Record of remaining time | 01 | 02 | 03 | 04 | 05 | 06 | 07 | 08 | 09 | 10 | 11 | 12 |
|---|---|---|---|---|---|---|---|---|---|---|---|---|
| Amount of Collected Data | 24 | 24 | 24 | 24 | 24 | 24 | 24 | 24 | 24 | 24 | 24 | 24 |
| M1 | 72 | | | | 72 | | | 72 | | | 72 | |
| Time Tag | 01 | | | | 02 | | | 03 | | | 04 | |
| Remaining Time Interval (Day) | 0~3 | | | | 3~6 | | | 6~9 | | | 9~12 | |
| M2 | 48 | | 48 | | 48 | | 48 | | 48 | | 48 | |
| Time Tag | 01 | | 02 | | 03 | | 04 | | 05 | | 06 | |
| Remaining Time Interval (Day) | 0~2 | | 2~4 | | 4~6 | | 6~8 | | 8~10 | | 10~12 | |

Fig. 4

| TR of remaining time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Amount of Collected Data | 48 | 48 | 48 | 48 | 48 | 48 | 48 | 48 | 48 | 48 | 48 | 48 | 24 | 24 | 24 | 24 | 24 | 24 | 24 | 24 | 24 | 24 | 24 | 24 |
| M3 | 216 | | | | | | 216 | | | | | 216 | | | | | | | | 216 | | | | |
| Time Tag | 01 | | | | | | 02 | | | | | 03 | | | | | | | | 04 | | | | |
| Remaining Time Interval (Day) | 0~4.5 | | | | | | 4.5~9 | | | | | 9~15 | | | | | | | | 15~24 | | | | |
| M4 | 144 | | | 144 | | | 144 | | | 144 | | | 144 | | | 144 | | | 144 | | | 144 | | |
| Time Tag | 01 | | | 02 | | | 03 | | | 04 | | | 05 | | | 05 | | | | | | 06 | | |
| Remaining Time Interval (Day) | 0~3 | | | 3~6 | | | 6~9 | | | 9~12 | | | 12~18 | | | | | | | | | 18~24 | | |

Fig. 5

METHOD AND SYSTEM FOR DIAGNOSING REMAINING LIFETIME OF STORAGES IN DATA CENTER

FIELD OF THE INVENTION

The present invention relates to a method and a system for diagnosing remaining lifetime of storages in a data center. More particularly, the present invention relates to a method and a system for diagnosing remaining lifetime of storages in a data center by modeling collected attributes of the storages.

BACKGROUND OF THE INVENTION

In a data center, there are hundreds of thousands storages, e.g. HDDs (Hard Disk Drive), SSDs (Solid State Drive), magnetic platters and even CDs (Compact Disk). The storages are connected to remote devices and can be accessed to provide a variety of services. The storages are the most costly components in the data center. On one hand, it needs to provision sufficient quantity of storages to fulfill requirements of workloads run over a portion of servers in the data center. On the other hand, due to long-term use, lifetimes of the storages are shorter than that used in personal computers. How to save the expense of storages in procurement and maintenance is a key factor to reduce fixed cost of the data center.

It is obvious that if a trend of operation of the data center is available, the storages can be automatically deployed for the most economical configuration. Then, the most effective use of the storages can be obtained, and accordingly, the target above can be achieved. However, due to unpredictable requirements from the workloads, all the storages are passively standby for use rather than premeditated provisioned. More spare storages are necessary and that incurs a burden which cannot be omitted. Under this situation, it is important to have a picture of lifetimes of the storages since the more accurate remaining lifetime of the storages that one can learn and handle, the less waste and the less risk it may cause. And in turn, more value can be provided.

Real lifetime of a storage is an objective data that can be obtained when the storage finally fails. No one can figure it out in the unknown future. It is lucky that there are some physical attributes of the storage that can be traced and recorded. With the associated records, by comparing among other storages in the same data center (working environment), the day one storage failed can be roughly predicted by some methods though the results are not always accurate. Now, a dilemma is faced by the administrator of the data center: to remove a storage from the data center too early before it actually fails, as is predicted to be failed soon by any predictive method, it is a cost waste; on the contrary, if too late, huge data will be lost without backups. It is not affordable for the data center.

Hence, reliable methods for determining terminating days for the storages are desired. There are some prior arts, such as U.S. Pat. No. 9,229,796 (system and method for determining disk failure indicator to predict future disk failures), U.S. Pat. No. 9,542,296 (disk replacement using a predictive statistical model), U.S. Pat. No. 9,612,896 (prediction of disk failure), U.S. Pat. No. 9,244,790 (system and method for predicting future disk failures), and US patent application No. 20170206026 (predicting solid state drive reliability), disclosing different methods. However, the results may not be so useful since the methods don't take dynamic changes of the environment into consideration. One accident may reduce or prolong lifetime of the storage. Therefore, a continuous assessment for remaining lifetime of storages in the data center is meaningful, expected, and required.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to fulfill the requirements above, a method for diagnosing remaining lifetime of storages in a data center is disclosed. The method includes the steps of: a) sequentially and periodically collecting operating attributes of failed storages along with time-to-fail records of the failed storages in a data center; b) grouping the operating attributes collected at the same time or fallen in a continuous period of time so that each group has the same number of operating attributes; c) sequentially marking a time tag for the groups of operating attributes; d) generating a trend model of remaining lifetime of the storages from the operating attributes and time-to-fail records by machine learning (ML) and/or deep learning (DL) algorithm(s) with the groups of operating attributes and time-to-fail records fed according to the order of the time tags; and e) inputting a set of operating attributes of a currently operating storage into the trend model to calculate a remaining lifetime therefor.

According to the present invention, the time-to-fail record is the time interval between the moment of record and the moment of failure in the unit of second, hour, and/or day. The operating attribute may be, but not limited to, S.M.A.R.T. (Self-Monitoring, Analysis and Reporting Technology) attribute, IOPS (Input/Output Operations Per Second) of a storage, throughput from a storage or bandwidth arranged for a storage. The storage may be, but not limited to, a HDD (Hard Disk Drive), SSD (Solid State Drive), magnetic platter or CD (Compact Disc). The ML and/or DL algorithm may be, but not limited to, RF (Random Forest) algorithm, SVM (Support Vector Machine) algorithm, or RNN (Recurrent Neural Network) algorithm.

Preferably, the method further includes a step after step e): f) processing step a) to step d) periodically or when operating attributes of failed storages and corresponding time-to-fail records of a new failed storage in the data center are available.

Preferably, the method further includes a step after step e): f1) alerting when the calculated remaining lifetime is shorter than a predetermined value for all storages.

Preferably, the method further includes a step after step e): f2) alerting when a calculated remaining lifetime dropped significantly than previously calculated remaining lifetime and finding out abnormally varied operating attribute(s).

Preferably, the method further includes a step after step f2): f3) providing a report on abnormal causes and a suggestion for repairing the storage.

A diagnosing remaining lifetime system for storages in a data center is also disclosed in the present invention. The diagnosing remaining lifetime system has an executive server which is connected with storages in the data center directly or indirectly. It is for sequentially and periodically collecting operating attributes of failed storages along with time-to-fail records of the failed storages. The executive server comprises: an attribute database, for storing the collected operating attributes and time-to-fail records; a data processing module, for grouping the operating attributes collected at the same time or fallen in a continuous period of time in the attribute database so that each group has the same number of operating attributes, and sequentially marking a time tag for the groups of operating attributes; a ML/DL module, for generating a trend model of remaining lifetime of the storages from the operating attributes and time-to-fail records by ML and/or DL algorithm(s) with the groups of operating attributes and time-to-fail records fed according to the order of the time tags from the data processing module; and a remaining lifetime calculating module, for calculating remaining lifetimes for all currently operating storages by inputting operating attributes of currently operating storages into a recently generated trend model and fetch the results therefrom.

According to the present invention, the time-to-fail record is the time interval between the moment of record and the moment of failure in the unit of second, hour, and/or day. The operating attribute may be, but not limited to, S.M.A.R.T. attribute, IOPS of a storage, throughput from a storage or bandwidth arranged for a storage. The storage may be, but not limited to, a HDD, SSD, magnetic platter or CD. The ML and/or DL algorithm may be, but not limited to, RF algorithm, SVM algorithm, or RNN algorithm.

Preferably, the attribute database may be further for storing collected operating attributes and corresponding time-to-fail records of a new failed storage in the data center when the data are available. The diagnosing remaining lifetime system may further include an alarm module, for alerting when the calculated remaining lifetime is shorter than a predetermined value for all storages. The alarm module further alerts when a calculated remaining lifetime dropped significantly than previously calculated remaining lifetime and finding out abnormally varied operating attribute(s). The diagnosing remaining lifetime system may further include a reporting module, for providing a report on abnormal causes and a suggestion for repairing the storage.

The attribute database, the data processing module, the ML/DL module, the remaining lifetime calculating module, the alarm module or the reporting module may be hardware mounted or software installed in the executive server.

Preferably, the data processing module further judges if operating attributes from a newly installed storage in the data center are the same as that of other storages, checks if there are trend models in the ML/DL module able to apply to the newly installed storage, and chooses operating attributes for the ML/DL module to build a new trend model for all storages.

BRIEF DESCRIPTION OF THE DRAWINGS

FIG. 2 shows a table listing an example of collected operating attributes of a failed storage along with time-to-fail records of the failed storages in a data center.

FIG. 3 is a table showing an example of operating attributes and time-to-fail records of failed storages from 1/1 to 1/25.

FIG. 4 shows results of grouping.

FIG. 5 shows other results of grouping.

DETAILED DESCRIPTION OF THE PREFERRED EMBODIMENTS

The present invention will now be described more specifically with reference to the following embodiments.

Figure 1:
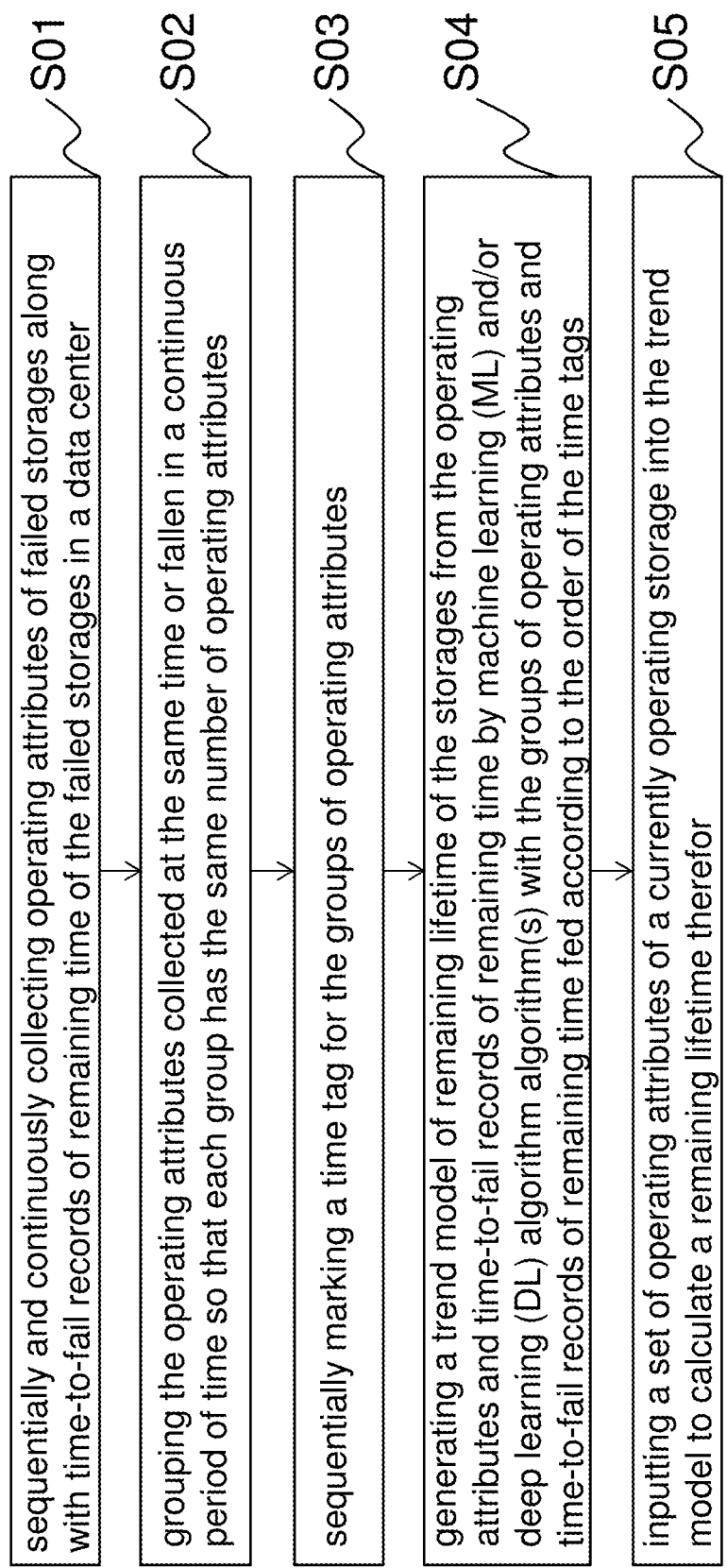
FIG. 1 is a flowchart showing steps of a method for diagnosing remaining lifetime of storages in a data center according to the present invention.

A method and a system for diagnosing remaining lifetime of storages in a data center by modeling collected attributes of the storages are disclosed by the preset invention. Please refer to FIG. 1. It is a flowchart showing steps of the method. The data center the method applies to includes lots of storages, may be hundreds of thousands, depending on the capacity the data center was designed. The storages may be, but not limited to, HDDs (Hard Disk Drive), SSDs (Solid State Drive), magnetic platters or CDs (Compact Disc). In general, most of the storages are HDDs. The second most storage should be SSDs. Some data centers may only use HDDs for operation while some others may have all kinds of storages. According to the present invention, the storages for diagnosing of remaining lifetimes should be the same hardware. Namely, data of HDDs collected are only used for HDDs and data of SSDs collected are only used for SSDs. It is meaningless if targets of application of the method belong to two or more categories. If a data center has storages more than two kinds, it needs to process the method independently for each one. In order to have a comprehensive understanding of the present invent, only "storage" will be used for illustration and to describe the behaviors of any one of HDD, SSD, magnetic platter or CD in the embodiments below.

A first step of the method is sequentially and periodically collecting operating attributes of failed storages along with time-to-fail records of the failed storages in a data center (S01). Some of the storages may be failed and cannot work daily or a period of time and new storages are required to replace over. The operating attributes may include, but not limited to S.M.A.R.T. (Self-Monitoring, Analysis and Reporting Technology) attribute, IOPS (Input/Output Operations Per Second) of a storage, throughput from a storage or bandwidth arranged for a storage. For example, if the storage is a HDD or SSD, S.M.A.R.T. attributes, IOPS of the storage, throughput from the storage and bandwidth arranged for the storage may all be used. Of course, associated operating attributes for magnetic platters or CDs can be applied thereto, respectively. It should be emphasized that the operating attributes are collected sequentially and periodically. For instance, one set of the operating attributes can be collected once an hour, twice per day, etc. The collecting order should be kept. No latter collected data are allowed to be arranged before the earlier collected ones. One set of operating attributes includes all operating attributes that were collected at the same time for one storage. Take the S.M.A.R.T. attributes for example. Everyone in the field of storage management knows that each S.M.A.R.T. attribute is labeled with an ID and named an attribute name, and describes a physical raw value about one HDD or SSD. For example, ID of 0x01 with attribute name of read error rate for data related to the rate of hardware read errors that occurred when reading data from a disk surface, ID of 0x09 with attribute name of power-on hours for showing total count of hours in power-on state, etc. All or some of the S.M.A.R.T. attributes can be applied in the method. On the other hand, each set of operating attributes comes along with a time-to-fail record of the same storage. The time-to-fail record is the time interval between the moment of record and the moment of failure in the unit of second, hour, and/or day. If one storage is judged "failed" at 2017/09/01/13:00:00, the time-to-fail record obtained at 2017/8/26/12:00:00 could be 522,000 seconds, 145 hours or 6.042 days. FIG. 2 shows a table listing an example of collected operating attributes of a failed storage along with time-to-fail records of the failed storages in a data center.

A second step of the method is grouping the operating attributes collected at the same time or fallen in a continuous period of time so that each group has the same number of operating attributes (S02). In order to illustrate this step, please refer to FIG. 3. It is a table showing an example of operating attributes and time-to-fail records of failed storages from 1/1 to 1/25 in a data center. In this example, as a simplified case, there are 8 storages, S1 to S8, used in a data center. "O" means there is 24 sets of operating attributes collected (once per hour). "X" means there is a last set of operating attributes from the storage on the top row happened on that day. "-" means there is no operating attribute collected. It is clear from FIG. 3 that storages S1, S3, S4, S5, S6, and S8 are all working well during 1/1 to 1/25. However, the storage S2 failed on 1/13 and the storage S7 failed on 1/25. Therefore, 288 sets of operating attributes for storage S2 and 576 sets of operating attributes collected for storage S7 are collected, respectively. Meanwhile, time-to-fail records for the storages S2 and S7 can be calculated after they had been sentenced to fail. The data center started working from 1/1 and all storages were on line on 1/1, too.

Results of grouping processed on 1/13 are shown in FIG. 4. In this example, there are 23 different operating attributes in one set. Total amount of operating attributes collected from storage S2 is 6624. Grouping the operating attributes is to settle a problem of imbalance data which would happen in later steps. In FIG. 4, there are 2 models of grouping. Model 1 (M1) is tabulated from row 4 to row 6. Sets of operating attributes collected in 3 continuous days are grouped in one group. So, there are 4 groups with time tags 01 to 04, respectively. Time interval for each group is 3 days. The operating attributes in one group can be treated as to be obtained "at the same time" and under similar operation environment. Since all groups contain the same number of operating attributes, when analyzing, each group has the same weight and algorithm for the groups won't be complicated. Model 2 (M2) is tabulated from row 7 to row 9. Sets of operating attributes collected in 2 continuous days are grouped in one group. So, there are 6 groups with time tags 01 to 06, respectively. Time interval for each group becomes 2 days. Of course, if the number of operating attributes in a set is large, one set can be used for one group without further combination.

Results of grouping processed on 1/25 are shown in FIG. 5. In FIG. 5, since there are operating attributes of two storages collected, each time-to-fail record may correspond to different number of sets of operating attributes. For example, time-to-fail records of 01 to 12 (day) corresponds to 48 sets of operating attributes (available from storages S2 and S7) and time-to-fail records of 13 to 24 (day) corresponds to 24 sets of operating attributes (available from storage S7). There are 2 models of grouping presented in this example. Model 3 (M3) is tabulated from row 4 to row 6. Sets of operating attributes collected in continuous 4.5 days, 4.5 days, 6 days and 9 days are grouped, respectively. Therefore, the 4 groups are tagged with time tags 01 to 04, respectively. In this case, time intervals for each group may not the same. "4.5 days" means the operating attributes collected in continuous 4 days and a next half day are grouped. Time interval is not necessary to include a full day. Thus, each group can have the same number of sets of operating attributes, 216. Similarly, sets of operating attributes collected in continuous 3 days, 3 days, 3 days, 3 days, 6 days and 6 days are grouped, respectively. The 6 groups are tagged with time tags 01 to 06, respectively. In this case, although time intervals for all groups may not be the same, each group still can have 144 sets of operating attributes. As well, the number of sets of operating attributes in one group may reduce to 48, 24 or even less. It is not restricted by the present invention. If there are more failed storages, grouping can be more flexible.

A third step of the method is sequentially marking a time tag for the groups of operating attributes (S03). The way of marking time tags has been revealed above with reference of FIG. 4 and FIG. 5. It is not repeated again.

Figure 6:
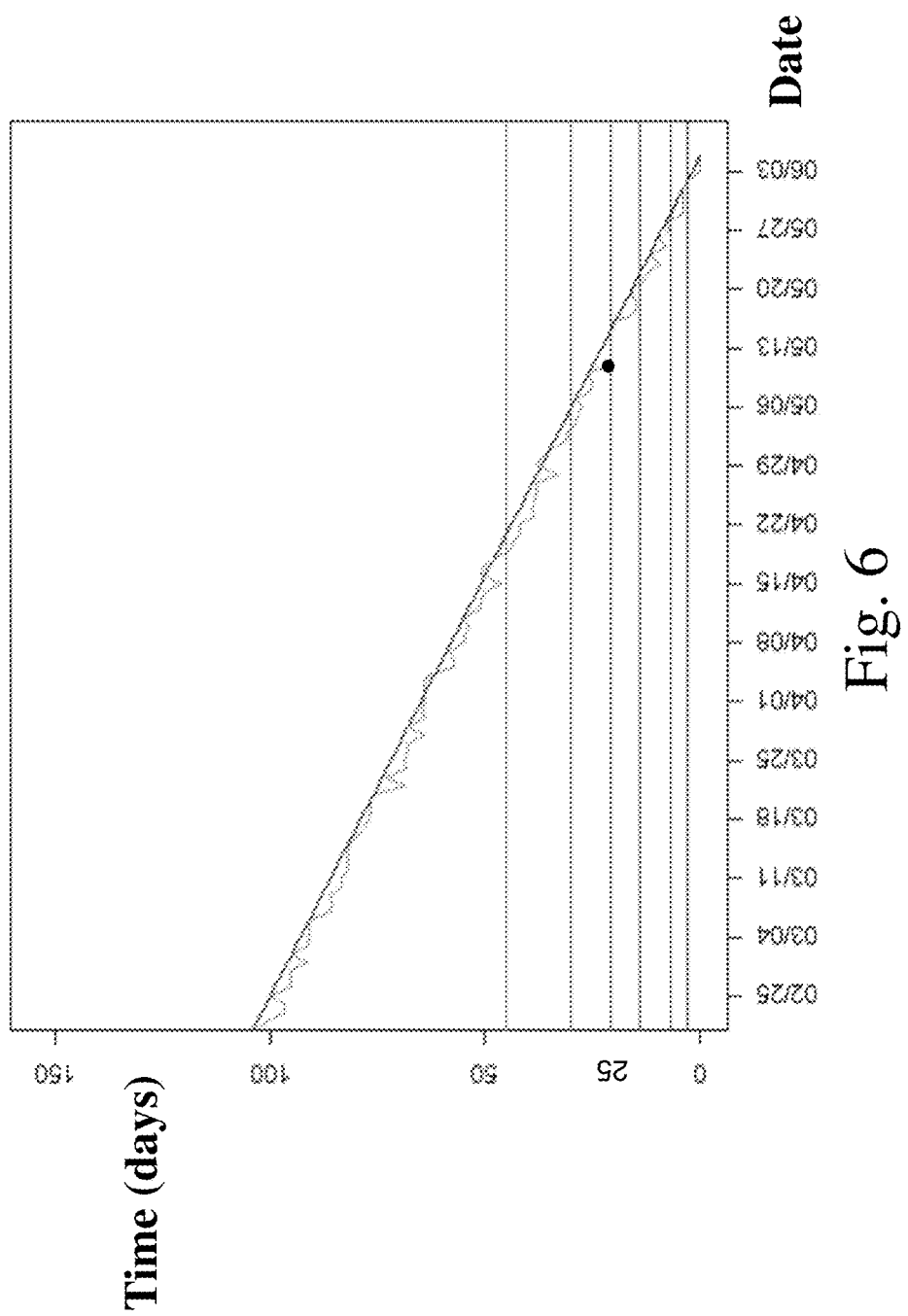
FIG. 6 shows a typical result of remaining lifetime for a storage calculated from a trend model.

A fourth step of the method is generating a trend model of remaining lifetime of the storages from the operating attributes and time-to-fail records by ML and/or DL algorithm(s) with the groups of operating attributes and time-to-fail records fed according to the order of the time tags (S04). Remaining lifetime is a calculated time from the trend model for each storage, which offers a reference lifetime based on the data (groups of operating attributes and time-to-fail records) from other failed storages in the data center. As mentioned above, the trend model is built by one or more ML and/or DL algorithms. There are many ML and/or DL algorithms can be applied. It is not limited by the present invention. Preferably, RF (Random Forest) algorithm, SVM (Support Vector Machine) algorithm, and RNN (Recurrent Neural Network) algorithm are recommended. A typical result of remaining lifetime for a storage calculated from the trend model is shown in FIG. 6. The remaining lifetime calculated for each date form a polyline, extending from left to right while the real lifetime (from the time-to-fail records) is a sloping straight line for a reference of feasibility.

Last, inputting a set of operating attributes of a currently operating storage into the trend model to calculate a remaining lifetime therefor (S05). FIG. 6 is the result of step S05. On each date, available remaining lifetimes for all storages can be provided to the administrator of the data center for his judgment: which one(s) should be backed up in case of data lost and replaced.

Preferably, after S05, there can be a further step: processing step S01 to step S04 periodically or when operating attributes of failed storages and corresponding time-to-fail records of a new failed storage in the data center is available (S06). It means renew of the trend model (rebuilt) can be periodical. It can be once a day on 12:00. It can also be every 1, 2, 6 or 12 hours. Most important of all, if a newly failed storage is found, all the operating attributes from that storage and calculated time-to-fail records can be used to renew the trend model immediately.

There can also be a step after step S05: alerting when the calculated remaining lifetime is shorter than a predetermined value for all storages (S07). Please see FIG. 6 again. Each horizontal line on the chart refers to a remaining lifetime. If remaining lifetime of 25 days is set as the predetermined value, when the horizontal comes across the polyline one the dot, a warning will initiate on 5/10 to remind the administer. Of course, warnings are provided synchronously for all storages met the predetermined value of remaining lifetime.

Figure 7:
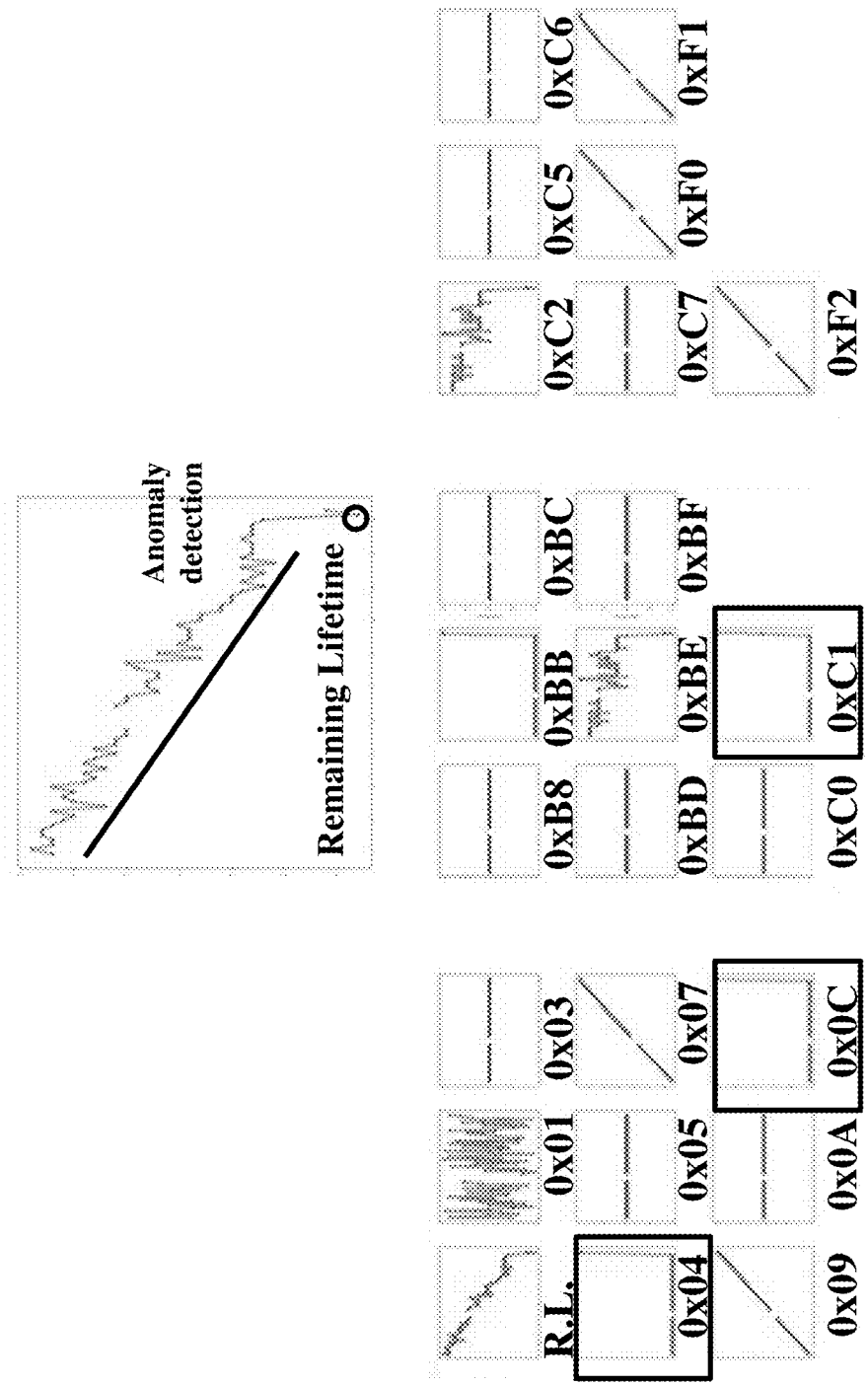
FIG. 7 and FIG. 8 shows charts of calculated remaining lifetime with date (on the top) and operating attributes varied with date (on the bottom).
Figure 8:
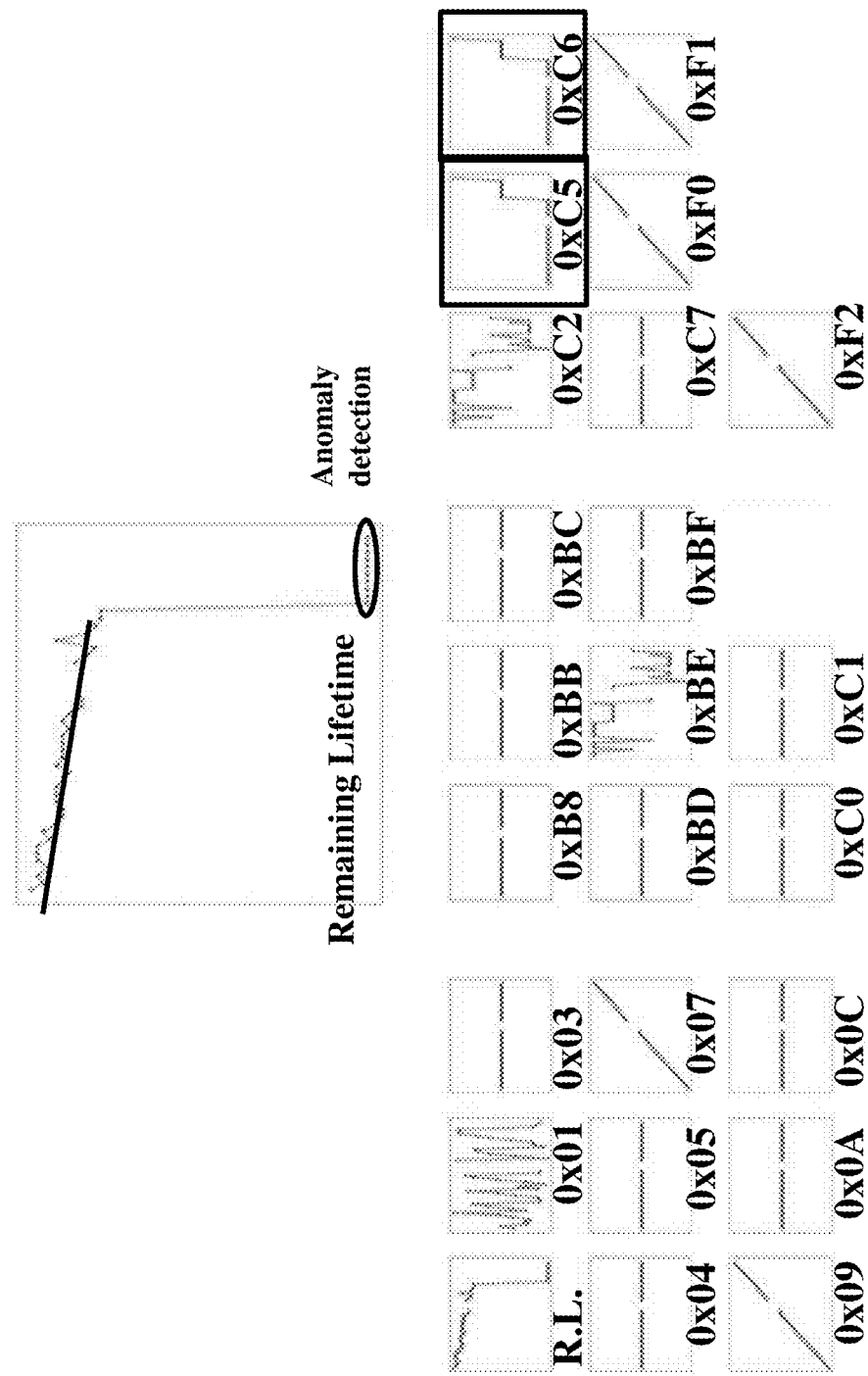

It is better to include a step after step S05: alerting when a calculated remaining lifetime dropped significantly than previously calculated remaining lifetime and finding out abnormally varied operating attribute(s) (S08). In order to have a comprehensive understanding about this step, please see FIG. 7. It shows charts of calculated remaining lifetime with date (on the top) and operating attributes varied with date (on the bottom). Due to limited space, the units on both axes are omitted. It is obvious that each chart has horizontal axis showing the date of data collection or data calculated while the vertical axis showing respective values. From FIG. 7, the calculated remaining lifetime marked by a circle drops significantly than previously calculated remaining lifetime. It is found that the operating attributes 0x04, 0x0C, and 0xC1 are raised abnormally. After step S08, there can be a further step: providing a report on abnormal causes and a suggestion for repairing the storage (S09). Under this situation, the reason on the report is related to abnormal shutdown of the storage. A suggestion may be checking the stability of the power supply. Another example shows in FIG. 8. Calculated remaining lifetimes enclosed by an oval drop significantly than previously calculated remaining lifetime and never recover to expected levels. It is found that the operating attributes 0xC5 and 0xC6 are raised abnormally. This is about bad tracks of the storage. A report to the administrator would suggest repairing the bad tracks.

Figure 9:
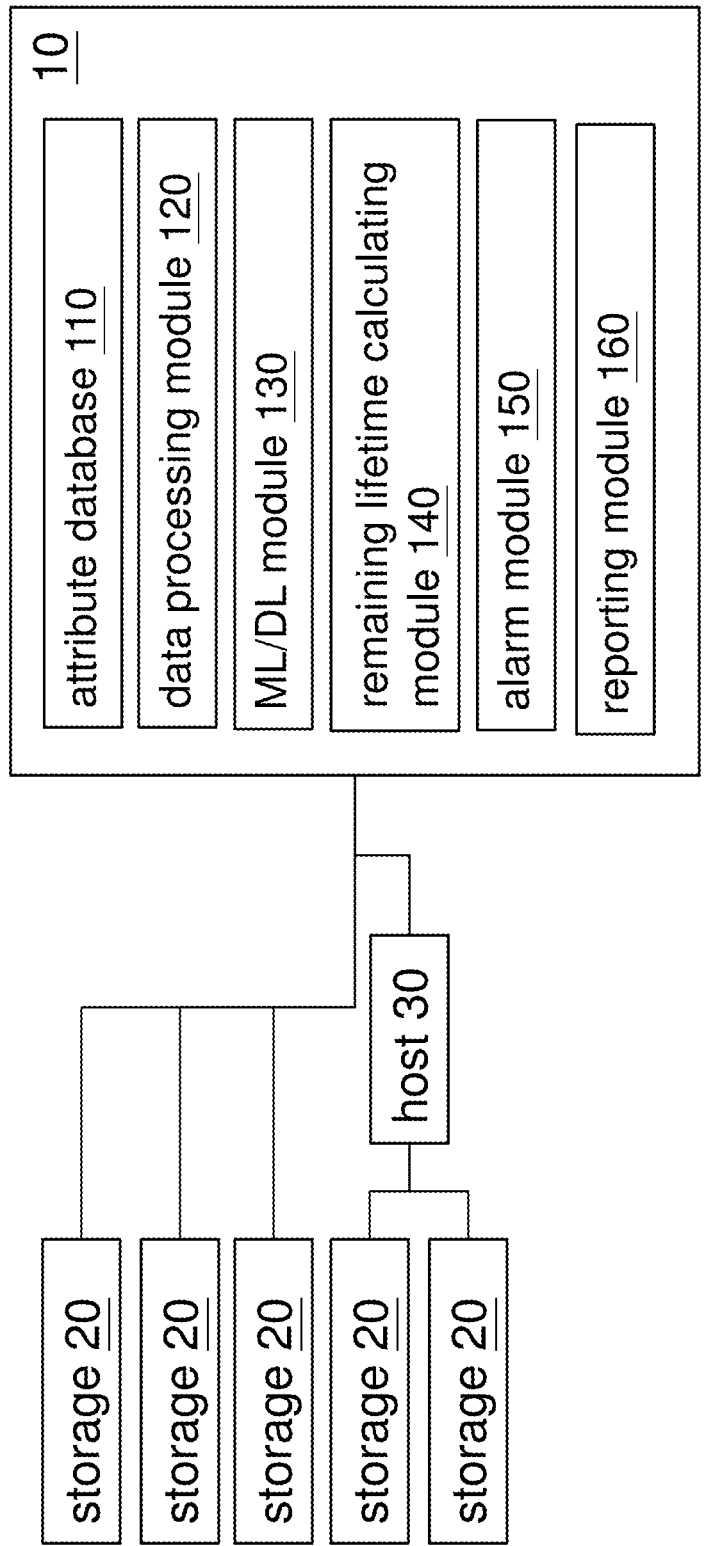
FIG. 9 is a schematic diagram of a diagnosing remaining lifetime system implementing the method above for storages in a data center according to the present invention.

In another embodiment, a diagnosing remaining lifetime system implementing the method above for storages in a data center is disclosed. Please refer to FIG. 9. It illustrates a schematic diagram of the diagnosing remaining lifetime system. The diagnosing remaining lifetime system has an executive server 10 which is connected with storages 20 in the data center directly or indirectly, e.g. through a host 30. The executive server 10 works for sequentially and periodically collecting operating attributes of failed storages along with time-to-fail records of the failed storages. The executive server 10 comprises an attribute database 110, a data processing module 120, a ML/DL module 130, a remaining lifetime calculating module 140, an alarm module 150, and a reporting module 160. Any module above may be hardware mounted or software installed in the executive server 10. Functions of each module will be illustrated in details below.

The attribute database 110 stores the collected operating attributes and time-to-fail records. It can further store collected operating attributes and corresponding time-to-fail records of a new failed storage in the data center when the data are available. The data processing module 120 works to group the operating attributes collected at the same time or fallen in a continuous period of time in the attribute database 110 so that each group has the same number of operating attributes. It can also sequentially mark a time tag for the groups of operating attributes. The ML/DL module 130 is for generating a trend model of remaining lifetime of the storages 20 from the operating attributes and time-to-fail records by ML and/or DL algorithm(s) with the groups of operating attributes and time-to-fail records fed according to the order of the time tags from the data processing module 120. The remaining lifetime calculating module 140 can calculate remaining lifetimes for all currently operating storages 20 by inputting operating attributes of currently operating storages 20 into a recently generated trend model and fetch the results therefrom. The alarm module 150 is for alerting when the calculated remaining lifetime is shorter than a predetermined value for all storages 20. It can also alert when a calculated remaining lifetime dropped significantly than previously calculated remaining lifetime and finding out abnormally varied operating attribute(s). The reporting module 160 can provide a report on abnormal causes and a suggestion for repairing the storage 20.

Figure 10:
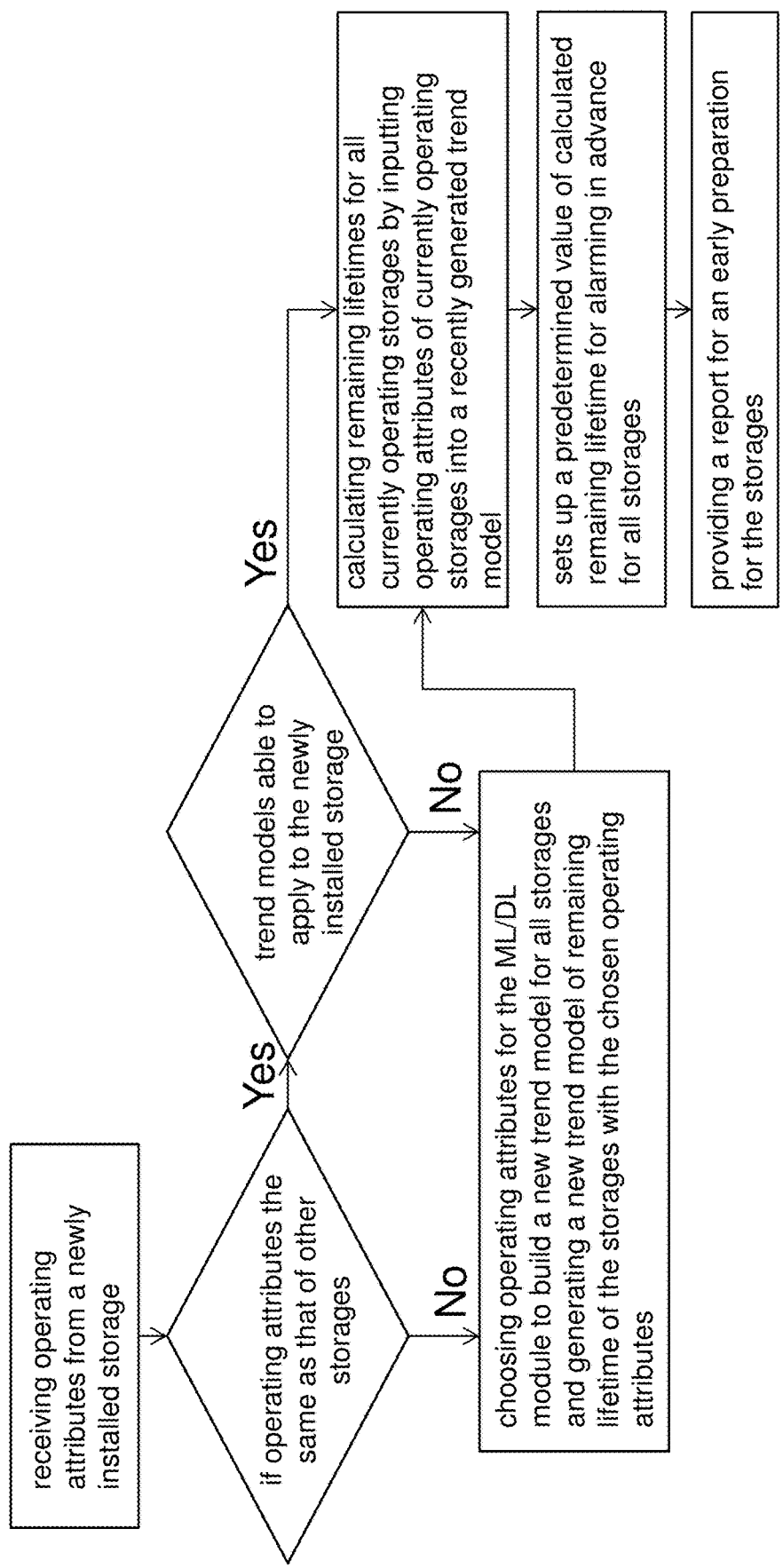
FIG. 10 is a flowchart of steps operating the data processing module.

The embodiments above are based on a scenario that all the storages contain the same operating attributes. However, in practice, not all the storages procured can provide the same operating attributes since they may come from different manufacturers. Under this situation, the data processing module 120 can further judge if operating attributes from a newly installed storage 20 in the data center are the same as that of other storages 20, checks if there are trend models in the ML/DL module 130 able to apply to the newly installed storage 20, and chooses operating attributes for the ML/DL module 130 to build a new trend model for all storages 20. A flowchart of steps operating the data processing module 120 is shown in FIG. 10. When the data processing module 120 receives operating attributes from the newly installed storage 20 in the data center, the data processing module 120 judges if operating attributes from a newly installed storage 20 in the data center are the same as that of other storages 20. If the answer is no, the data processing module 120 chooses operating attributes for the ML/DL module 130 to build a new trend model for all storages 20. The chosen operating attributes may include newly found operating attribute(s). The kinds of chosen operating attributes may be the common owned ones. A way to choose the operating attributes depends on the decision of the administrator. If the answer is yes, the data processing module 120 further checks if there are trend models in the ML/DL module 130 able to apply to the newly installed storage 20. If there is no trend model in the ML/DL module 130 able to apply to the newly installed storage 20, the data processing module 120 will choose operating attributes for the ML/DL module 130 to build a new trend model for all storages 20. Now we have a trend model of remaining lifetime of the storages 20 with the operating attributes, the remaining lifetime calculating module 140 can calculate remaining lifetimes for all currently operating storages 20 by inputting operating attributes of currently operating storages 20 into a recently generated trend model. Then, the alarm module 150 sets up a predetermined value of calculated remaining lifetime for alerting in advance for all storages 20. Finally, the reporting module 160 provides a report to remind the administrator for an early preparation for the storages 20.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for diagnosing remaining lifetime of storages in a data center, comprising the steps of:
   a) sequentially and continuously collecting operating attributes of failed storages along with time-to-fail records of remaining time of the failed storages in a data center;
   b) grouping, into two or more groups of operating attributes, the operating attributes of failed storages which were sequentially and periodically collected in step a) so that each group has the same amount of operating attributes;
   c) sequentially marking a time tag for the groups of operating attributes;
   d) generating a trend model of remaining lifetime of the failed storages from the operating attributes and time-to-fail records by machine learning (ML) or deep learning (DL) algorithm(s) with the groups of operating attributes and time-to-fail records provided according to an order of the time tags; and e) inputting a set of operating attributes of a currently operating storage into the trend model to calculate a remaining lifetime therefor, wherein if the data center has a storage newly installed, operating attributes of the newly installed storage are compared to the operating attributes of other storages to determine whether the operating attributes of the newly installed storage are the same as that of other storages; if the operating attributes of the newly installed storage are the same as that of other storages, then the trend model generated in step d) is applied to the newly installed storage, whereas if the operating attributes of the newly installed storage are different from that of other storages or the trend model generated in step d) does not apply to the newly installed storage, then a new trend model for all storages is built.

2. The method according to claim 1, wherein the time-to-fail record is in a unit of second, hour, or day, and begins to be recorded until a moment of failure.

3. The method according to claim 1, wherein the operating attribute is S.M.A.R.T. (Self-Monitoring, Analysis and Reporting Technology) attribute, IOPS (Input/Output Operations Per Second) of a storage, throughput from a storage or bandwidth arranged for a storage.

4. The method according to claim 1, wherein the storage is a HDD (Hard Disk Drive), SSD (Solid State Drive), magnetic platter or CD (Compact Disc).

5. The method according to claim 1, wherein the ML and/or DL algorithm is RF (Random Forest) algorithm, SVM (Support Vector Machine) algorithm, or RNN (Recurrent Neural Network) algorithm.

6. The method according to claim 1, further comprising a step after step e): f) processing step a) to step d) when operating attributes and corresponding time-to-fail records of a newly failed storage in the data center is received.

7. The method according to claim 1, further comprising a step after step e): f1) alerting when the calculated remaining lifetime is shorter than a predetermined value for all storages.

8. The method according to claim 1, further comprising a step after step e): f2) alerting when a calculated remaining lifetime drops over a predetermined amount from a previously calculated remaining lifetime and finding out abnormally varied operating attribute(s).

9. The method according to claim 8, further comprising a step after step f2): f3) providing a report on abnormal causes and a suggestion for repairing the storage.

10. A diagnosing remaining lifetime system for storages in a data center, having an executive server which is connected with storages in the data enter directly or indirectly for sequentially and continuously collecting operating attributes of failed storages along with time-to-fail records of remaining time of the failed storages, characterized in that the executive server comprises:

an attribute database, for storing the collected operating attributes and time-to-fail records;

a data processing module, for grouping, into two or more groups of operating attributes, the collected operating attributes stored in the attribute database so that each group has the same amount of operating attributes, and sequentially marking a time tag for the groups of operating attributes;

a ML/DL module, for generating a trend model of remaining lifetime of the failed storages from the operating attributes and time-to-fail records by ML or DL algorithm(s) with the groups of operating attributes and time-to-fail records provided according to an order of the time tags for the groups of operating attributes from the data processing module; and a remaining lifetime calculating module, for calculating remaining lifetimes for all currently operating storages by inputting operating attributes of currently operating storages into a recently generated trend model;

wherein the data processing module further judges if operating attributes of a newly installed storage in the data center are the same as that of other storages, checks if there are trend models in the ML/DL module able to apply to the newly installed storage, and chooses operating attributes for the ML/DL module to build a new trend model for all storages.

11. The diagnosing remaining lifetime system according to claim 10, wherein the time-to-fail record is in a unit of second, hour, or day, and begins to be recorded until a moment of failure.

12. The diagnosing remaining lifetime system according to claim 10, wherein the operating attribute is S.M.A.R.T. attribute, IOPS of a storage, throughput from a storage or bandwidth arranged for a storage.

13. The diagnosing remaining lifetime system according to claim 10, wherein the storage is a HDD, SSD, magnetic platter or CD.

14. The diagnosing remaining lifetime system according to claim 10, wherein the ML or DL algorithm is RF algorithm, SVM algorithm, or RNN algorithm.

15. The diagnosing remaining lifetime system according to claim 10, wherein the attribute database further stores operating attributes and corresponding time-to-fail records of a newly failed storage in the data center.

16. The diagnosing remaining lifetime system according to claim 10, further comprising an alarm module, for alerting when the calculated remaining lifetime is shorter than a predetermined value for all storages.

17. The diagnosing remaining lifetime system according to claim 16, wherein the alarm module further alerts when a calculated remaining lifetime drops over a predetermined amount from a previously calculated remaining lifetime and finding abnormally varied operating attribute(s).

18. The diagnosing remaining lifetime system according to claim 17, further comprising a reporting module, for providing a report on abnormal causes and a suggestion for repairing the storage.

19. The diagnosing remaining lifetime system according to claim 18, wherein the attribute database, the data processing module, the ML/DL module, the remaining lifetime calculating module, the alarm module or the reporting module is hardware mounted or software installed in the executive server.

* * * * *